*Inventor*
Robert H. Lawson.
By his Attorney

Inventor:
Robert H. Lawson.
By his Attorney.

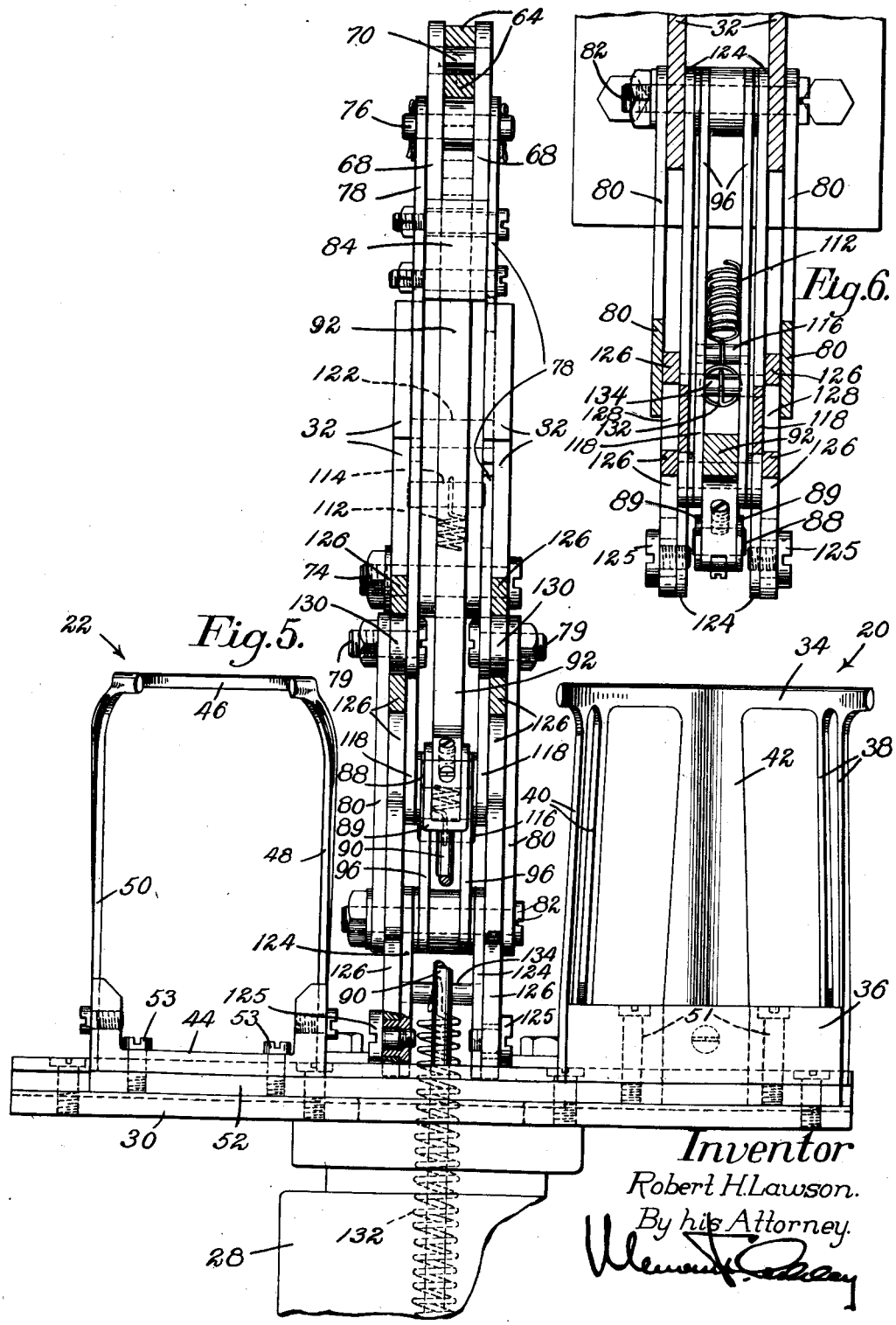

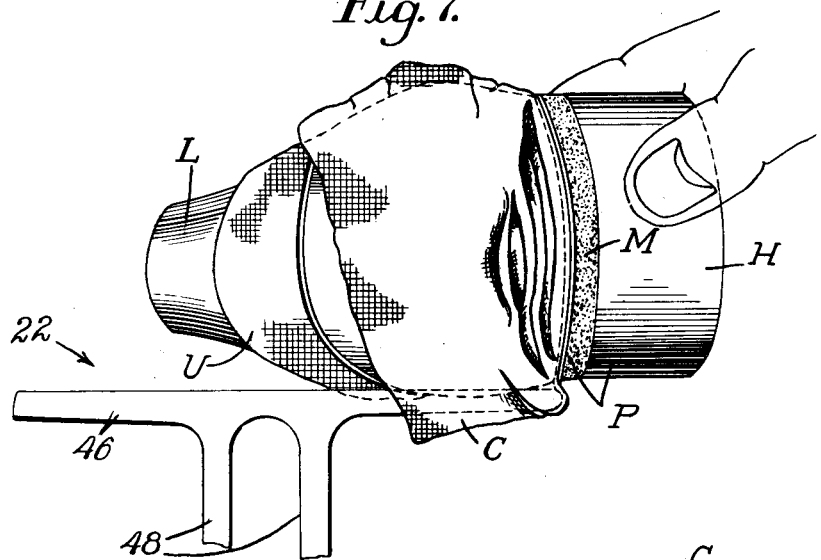
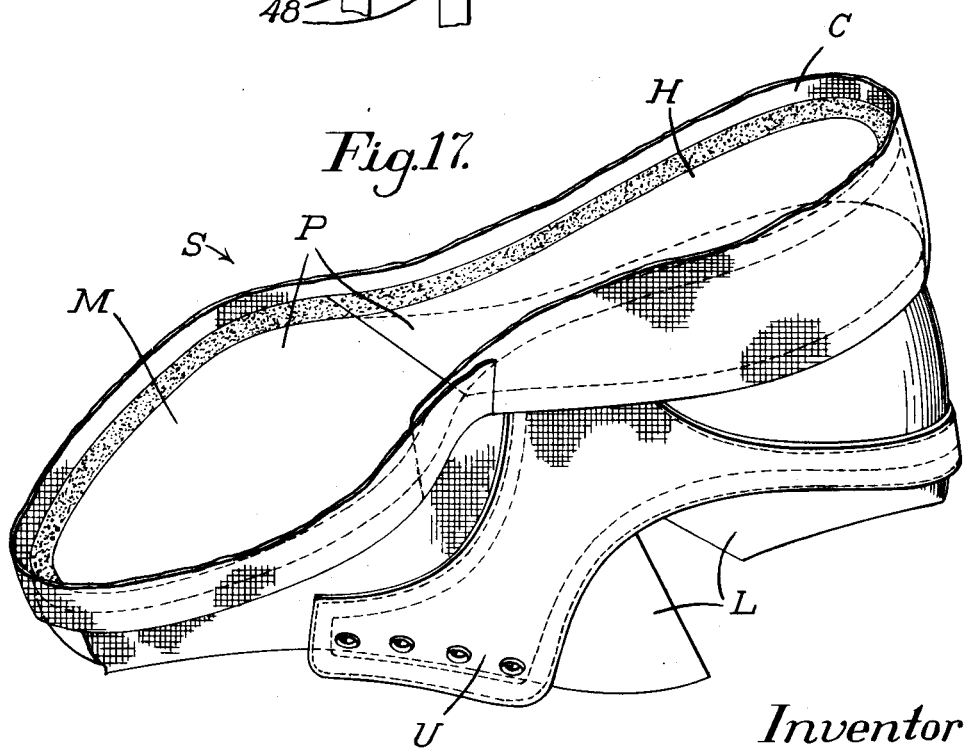

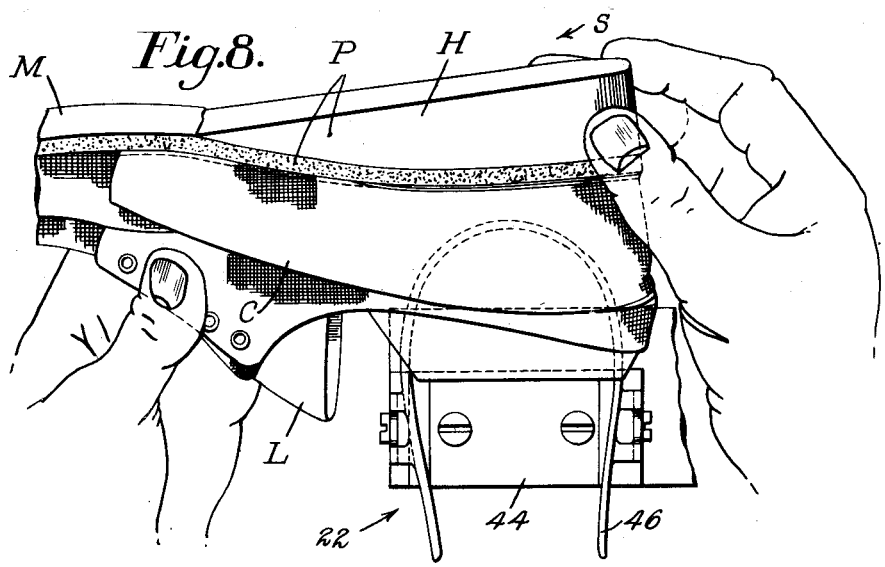
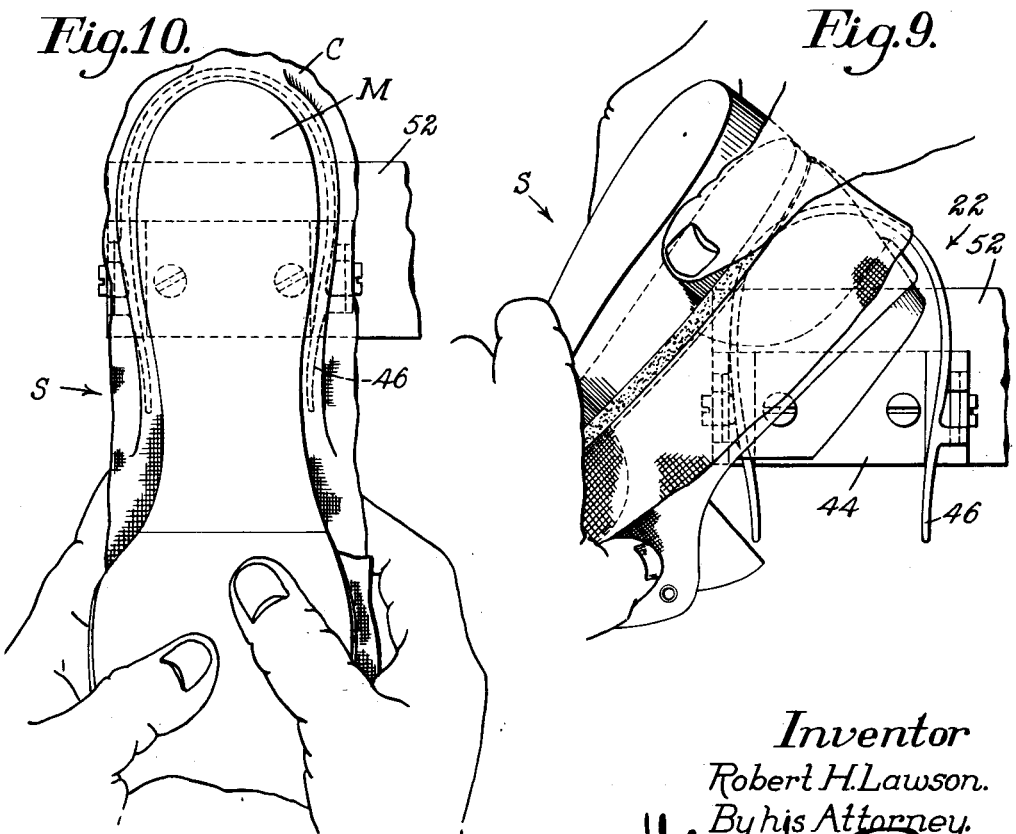

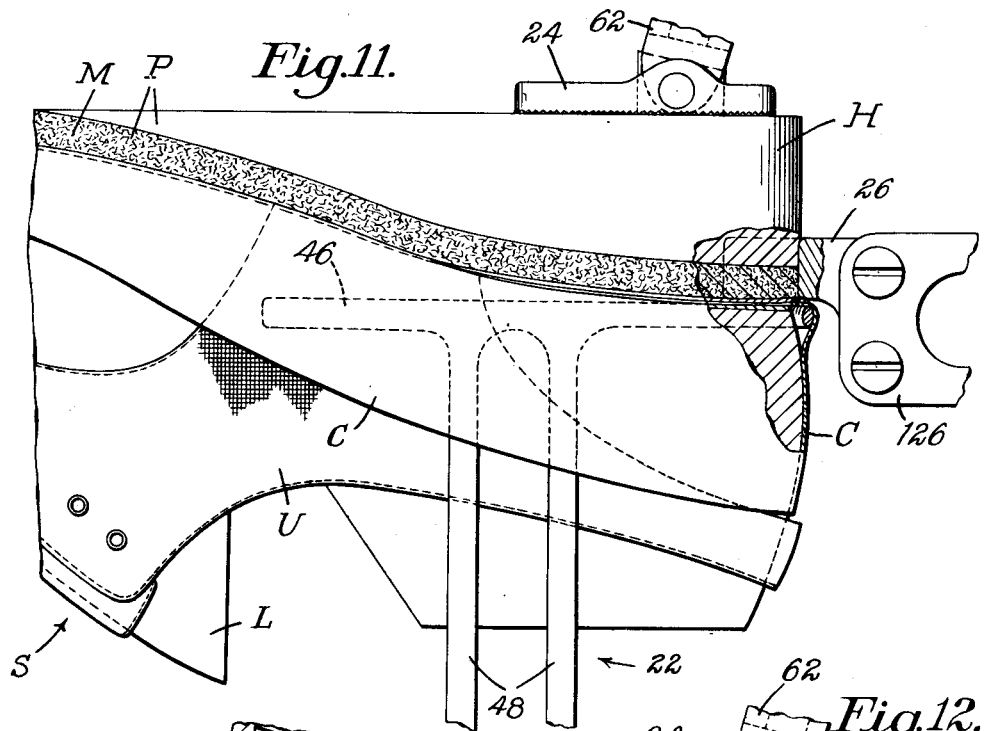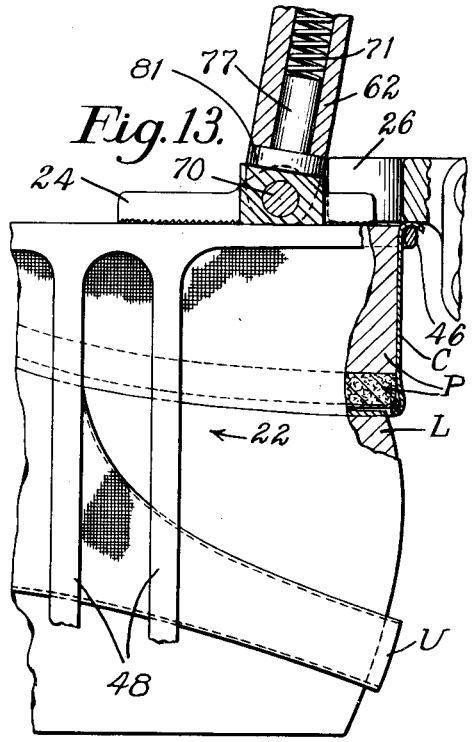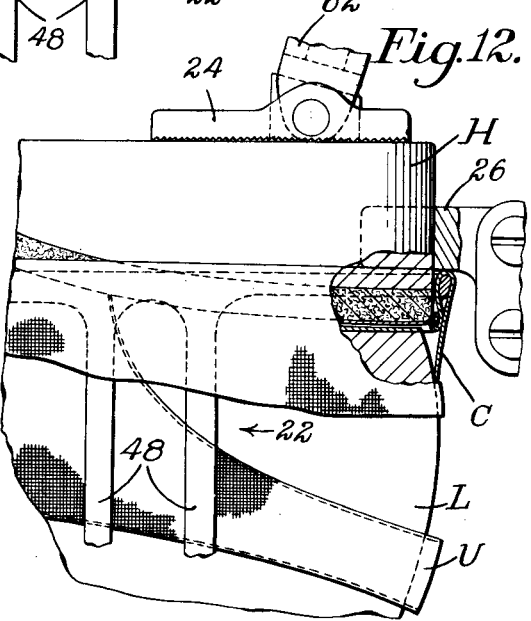

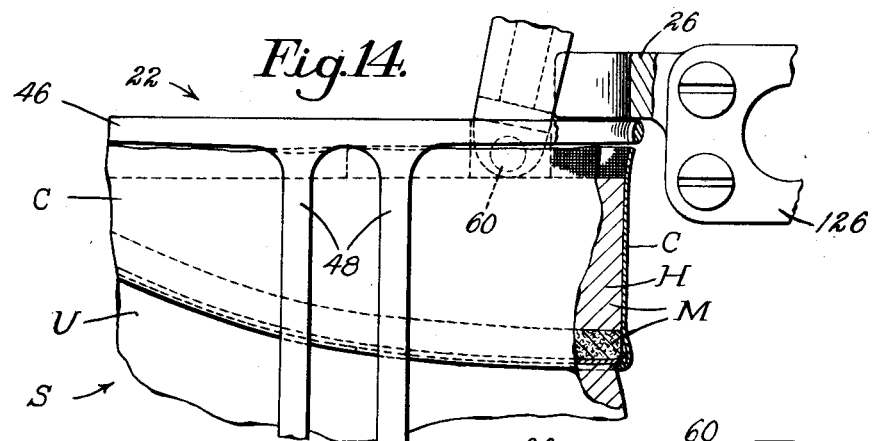
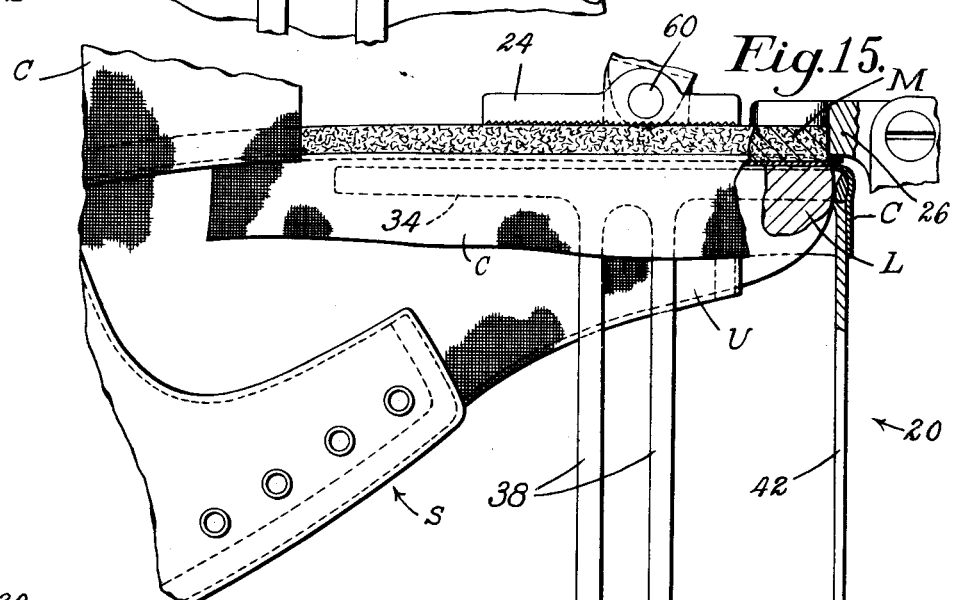
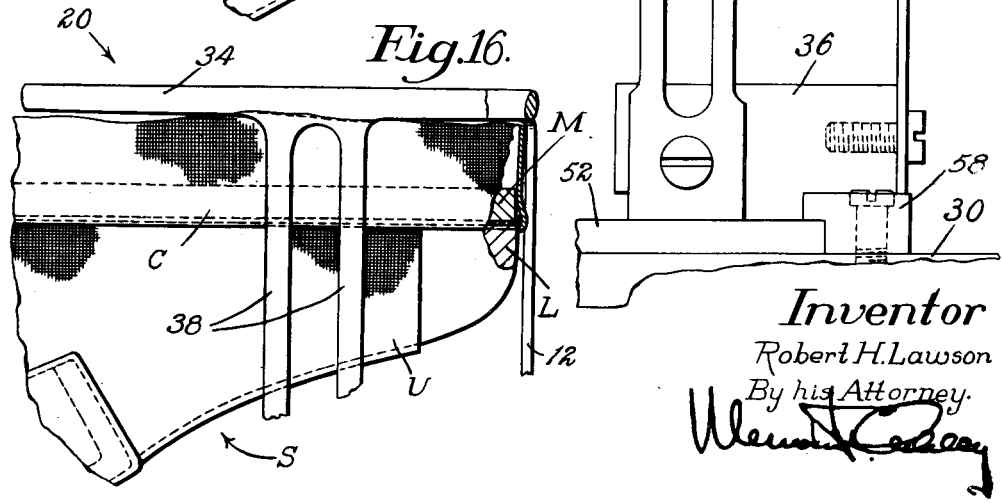

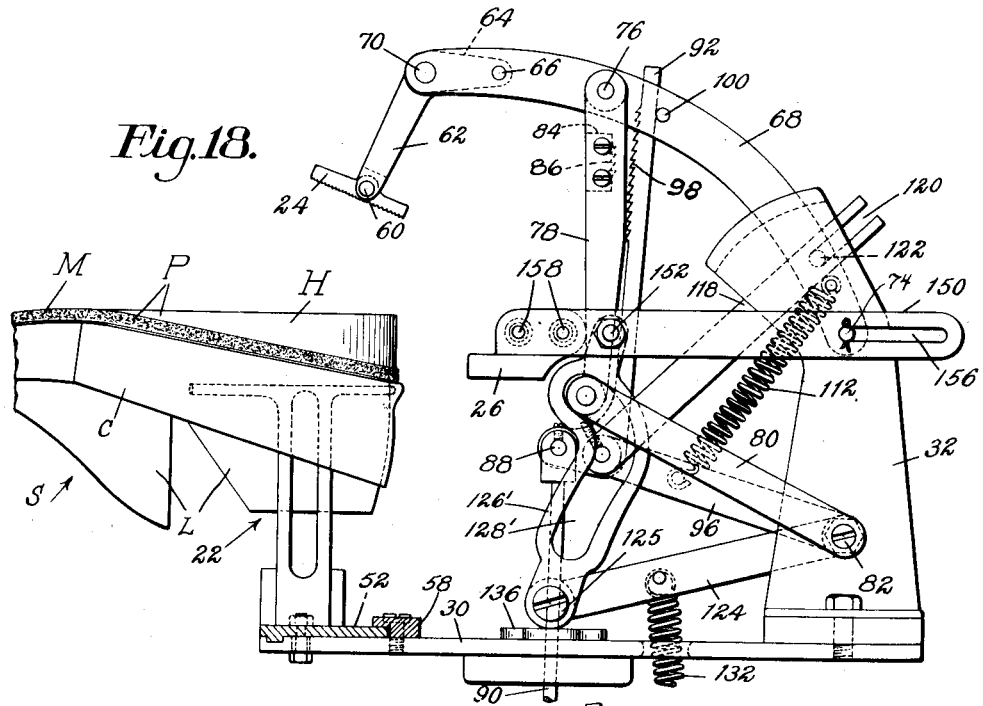
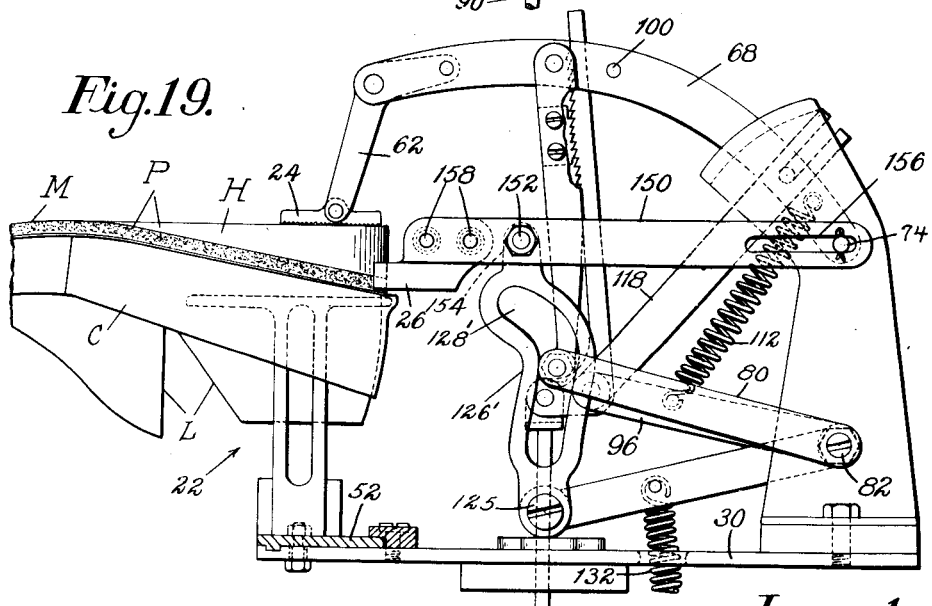

UNITED STATES PATENT OFFICE 2,422,737

METHOD OF AND MACHINE FOR TURNING THE PLATFORM COVERS OF PLATFORM SHOES

Robert H. Lawson, Beverly, Mass., assignor to United Shoe Machinery Corporation, Flemington, N. J., a corporation of New Jersey Application December 4, 1944, Serial No. 566,592

19 Claims. (Cl. 12—1)

This invention relates to methods of and machines for turning the platform covers of platform shoes. Such shoes, which are disclosed in United States Letters Patent No. 2,341,675, granted February 15, 1944, on an application filed in the name of John J. Walsh, are characterized by a relatively thick platform interposed between the insole and the outsole and having its edge covered with sheet material which has first been stitched to the upper and the insole and which is later laid and secured under the edge of the platform. While the platform may consist of a midsole alone, it usually comprises a midsole and a wedge heel secured together as a unitary assembly.

Before the cover can be laid and secured under the platform, it must first be turned down from the upright position in which it was stitched. The operation of turning the cover is often performed after a last has been inserted in the shoe and after the platform has been applied. The cover usually hugs the upper of the shoe tightly and resists turning, especially at the ends of the shoe. Operators are often unable to turn the covers at the ends of the shoe by hand and have to use pincers. In any case, the operation as heretofore carried out is laborious and time-consuming.

It is an object of the present invention to provide a method whereby platform covers may be easily and quickly turned. In accordance with the method disclosed herein, the turning of the platform cover is effected by a relative heightwise movement between the shoe and a tool which has been inserted between the platform cover and the last on which the shoe is mounted. The tool is conveniently stationary and is inserted between the platform cover and the last by manipulation of the shoe. The shoe during its heightwise movement may be given also an endwise component to enable the tool to clear that portion of the platform which extends beyond the body portion of the shoe. The turning operation, according to the method disclosed herein, is performed first at one end of the shoe and then at the other end.

A further object of the invention is to provide a machine for turning platform covers. In accordance with this object, the machine disclosed herein is provided with a tool adapted to be inserted between the platform cover and the last, and an abutment which is moved against the bottom of the shoe, the tool and the abutment being relatively movable to cause the platform cover to be turned over the tool. As shown herein, the tool is stationary and the abutment consists of a plunger. The machine is further provided with means for imparting an endwise thrust to the shoe to cause the tool to clear the extension of the platform beyond the body portion of the shoe.

The tool used in this machine is a blunt-edged generally U-shaped member curved to conform approximately to the outline of an end of the shoe and is resilient to enable it to fit shoes of different sizes or shapes. In the illustrated machine, two such tools are employed, one being adapted to fit the heel end of the shoe and the other to fit the toe end. These tools are mounted upon a slide which is movable transversely to bring first one of the tools into operating position relatively to the plunger and then to bring the other tool into operating position.

These and other novel features of the invention are illustrated in the drawings and are hereafter described and claimed.

Referring to the accompanying drawings,

Fig. 5 is a front elevation of the operating instrumentalities;

Fig. 6 is a sectional view taken on the line VI—VI of Fig. 1;

Fig. 7 is a detail view in side elevation of a portion of the heel turning tool showing how the shoe is manipulated to position it on the tool;

Fig. 8 is a plan view corresponding to the side elevation shown in Fig. 7;

Fig. 9 is a view similar to Fig. 8 showing a further step in the manipulation of the shoe to position the shoe on the turning tool;

Fig. 10 is a plan view similar to Figs. 8 and 9 showing the shoe completely positioned upon the tool;

Fig. 11 is a side elevation of the shoe positioned upon the tool after the movable shoe-engaging members of the machine have been brought into contact with the shoe;

Fig. 12 is a view similar to Fig. 11 showing the position of the various parts after the operation has begun;

Fig. 13 is a view similar to Figs. 11 and 12 showing the position of the various parts when the operation is nearly complete;

Fig. 14 is a view similar to Fig. 13 showing the position of the various parts after the cover has been completely turned;

Fig. 15 is a view in side elevation of a shoe positioned upon the toe turning tool at the beginning of the operation;

Figs. 16 is a view similar to Fig. 15 showing the toe end of the cover completely turned;

Fig. 17 is a view of a shoe showing both ends of the cover completely turned;

Fig. 18 is a side elevation of the operating instrumentalities of a modification of the machine disclosed in the foregoing figures, showing the various parts in their initial positions; and Fig. 19 is a view similar to Fig. 18 showing the positions assumed by the various parts during their operation.

The illustrative machine is shown herein as operating upon a shoe S (Fig. 1) mounted upon a form such as a last L, the shoe S having an upper U (Figs. 7 and 17), a platform P, and a cover C for the lateral edges of the platform. The platform P may, as shown herein, consist of a felt midsole M and a wooden wedge heel H securely attached to each other, although in some cases the wedge heel may be integral with the midsole and in others it may be omitted altogether.

Figure 3:
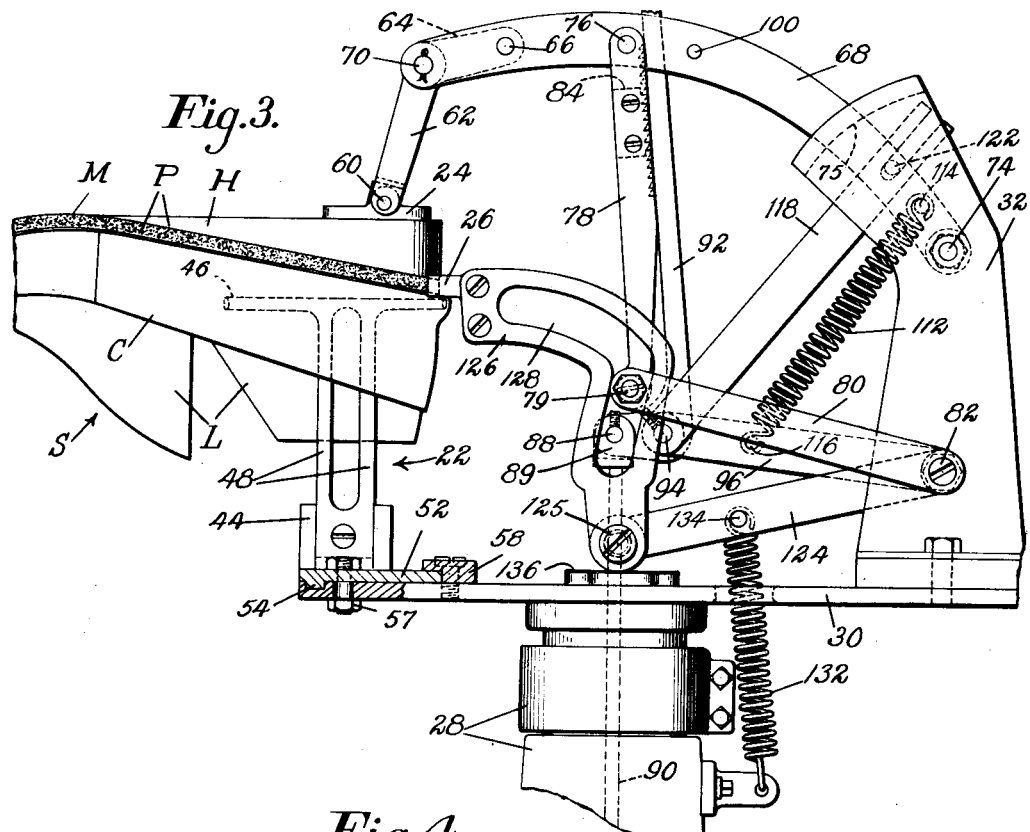
Fig. 3 is a side elevation of the operating instrumentalities at an early stage of the operation.
Figure 4:
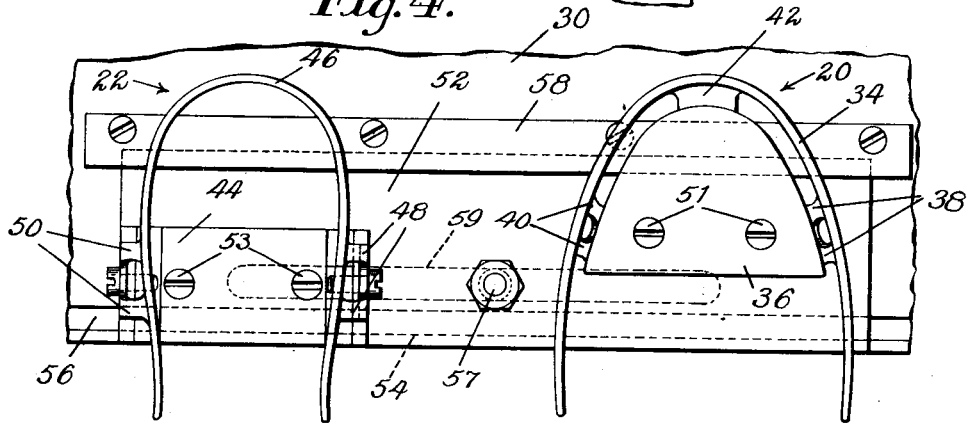
Fig. 4 is a plan view of the U-shaped cover turning tools with which the machine is provided.

The shoe-engaging members of the illustrative machine comprise a toe turning tool 20 (Figs. 15, 4 and 5), a heel turning tool 22 (Figs. 4 and 5), a plunger 24, and a tool 26 (Fig. 3) which serves to push a shoe forwardly during the operation and also to tension the cover as the cover is being turned. The supporting structure of the machine consists of a frame 28 (Fig. 1) comprising a hollow column adapted to rest upon the floor and supporting a shelf 30 which carries an upstanding bracket 32 in the form of a pair of spaced parallel plates.

The turning tools 20 and 22 are adapted for operation at the toe and the heel ends of the shoe, respectively. These members are stationary while the operation is being performed, but they are mounted for movement to enable either to be moved into its operating position while the other is moved out of operating position. The tool 20 (Figs. 4 and 5) has a U-shaped or horseshoe-shaped operative portion 34 of resilient metal disposed in a substantially horizontal plane and adapted to fit around the toe end of the smallest size shoe to be operated upon. The cross-sectional dimensions of the operative portion 34 are relatively small, the height, while slight compared to the heightwise dimension of the shoe, being greater than the thickness. The top edge of the U-shaped portion 34 is blunt, and preferably its entire surface is smooth to facilitate the turning of the platform cover over it. The natural spring of the metal is sufficient to enable the U-shaped portion 34 to yield to fit larger sizes of shoes and also to conform itself more or less generally to any shape of toe. The toe turning tool 20 is mounted upon a base 36, the U-shaped portion 34 being supported at a considerable height above the base 36 (Figs. 4, 5 and 15) by a plurality of bars which are integral with the portion 34 and depend therefrom. A pair 38 of these bars are provided at the right side of the tool and a similar pair 40 at the left side, the bars of each pair being parallel and spaced a slight distance from each other. Another bar 42 is provided at the rear of the tool. This arrangement of the supporting bars affords ample support to the U-shaped portion 34 while enabling it to flex in accordance with the size and shape of the toe end of the shoe to be operated upon. It will be noted that the free ends of the U-shaped portion 34 extend beyond the bars 38 and 40 at each side of the tool.

The heel turning tool 22 is somewhat similar to the toe turning tool 20 and is mounted upon a base 44. The tool 22 has a U-shaped or horseshoe-shaped portion 46 which is supported at a considerable height above the base 44 by a pair of integral depending parallel spaced bars 48 on the right side and a similar pair 50 on the left side. The U-shaped portion 46 of the tool 22 is shaped to enable it to fit around the smallest size of heel likely to be operated upon, the metal being resilient enough to yield to enable it to fit larger sizes and all shapes of heels. In cross section, this portion of the tool has a blunt, smoothly rounded top edge, and is of greater height than thickness, both dimensions being relatively small. The tool 22 is not provided with any supporting bar corresponding to the back supporting bar 42 of the toe turning tool 20, but is free of all support except that of the side supporting bars 48 and 50. Such freedom of support, as will appear later, enables a shoe to be easily manipulated in such a manner as to position the shoe on the heel turning tool.

Figure 2:
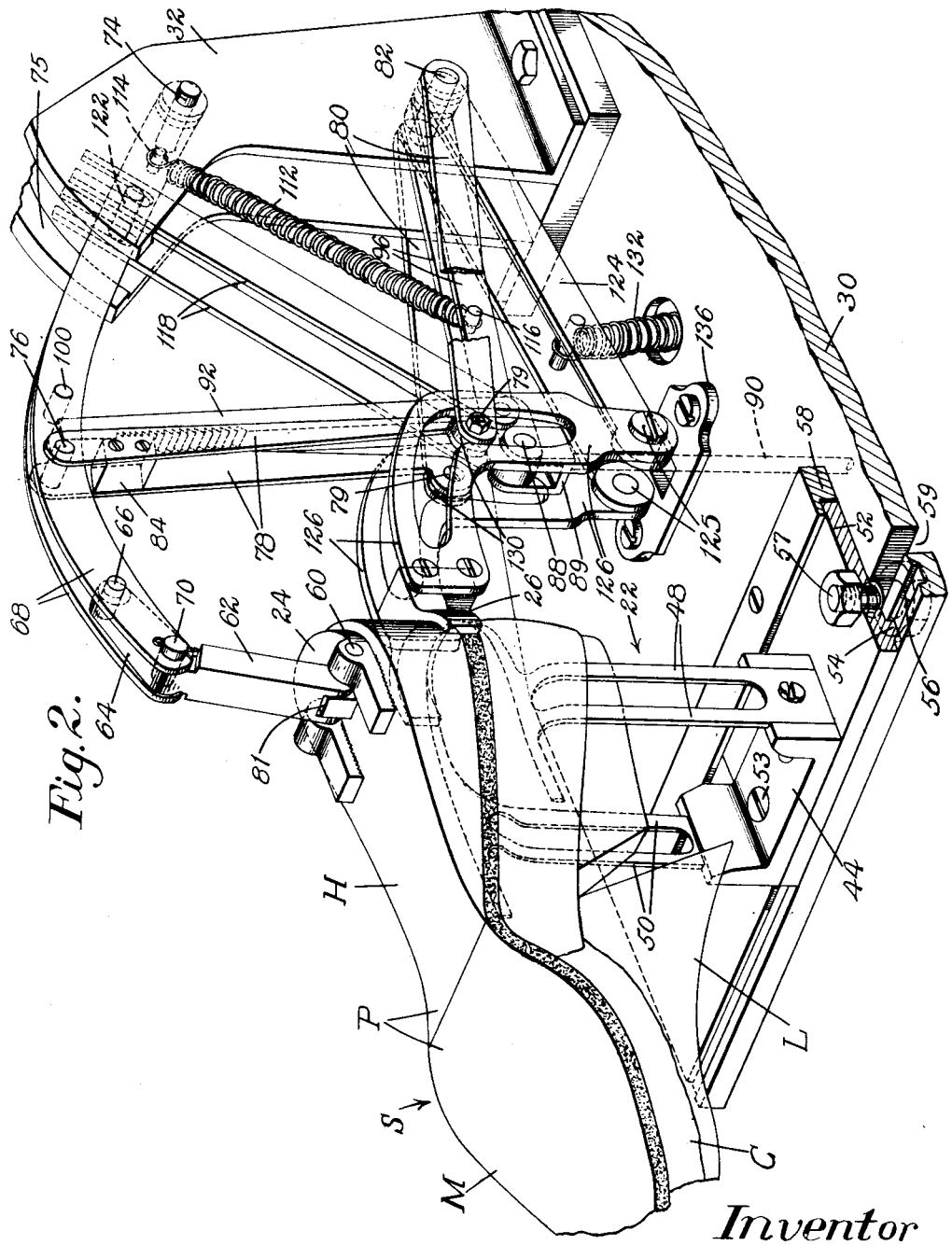
Fig. 2 is an angular view of the operating instrumentalities of the machine.

The supporting bases 36 and 44 of the turning tools 20 and 22 above described are secured by screws 51 and 53 to a slide 52 which rests upon the forward marginal portion of the shelf 30. The slide 52 has a depending tongue 54 (Fig. 2) which engages a slot 56 in the shelf 30 to guide the slide for movement transversely of the machine. Further guidance for the slide 52 is provided by a rabbeted guide member 58 which overlaps the rear edge of the slide 52 and is secured to the shelf 30. The slide 52 may be moved manually to bring either the toe turning tool 20 or the heel turning tool 22 into operating position while at the same time moving the other tool out of the way. A stop bolt 57 extends upwardly through a slot 59 in the shelf 30 and through a hole in the slide 52, the bolt 57 having a threaded upper end portion of reduced diameter to receive a nut for clamping the shoulder of the lower portion of the bolt against the under surface of the slide. The ends of the slot 59 engage the bolt 57 to stop the slide in proper positions for cooperation of the plunger 24 with the tools 20 and 22, respectively. The head of the bolt 57 prevents accidental removal of the slide 52 from the shelf 30.

The plunger 24 (Figs. 1 and 2) consists of a U-shaped plate pivotally mounted upon a horizontal pin 60 which is secured in the lower free end of a bell-crank arm 62. Integral with the arm 62 but extending rearward therefrom is an arm 64 which is pivotally connected by means of a horizontal pin 66 to a lever 68 which consists of a pair of spaced parallel arms. Rigidly secured in the lever 68 forwardly of the pin 69 is a horizontal pin 70 which extends through a slot 72 (Fig. 1) in the bell crank at the junction of the bell-crank arms 62 and 64 to permit a limited rocking movement of the bell crank about the pin 66. A compression spring 71 (Fig. 1) housed within a longitudinal bore in the bell-crank arm 62 exerts a thrust against a plunger 73 slidable in the bore to urge the plunger against the pin 70, the effect of the spring being to urge the bell crank counterclockwise about the pin 66 to a stop position determined by the upper end of the slot 72. As will later be explained, when the plunger 24 engages a shoe bottom, the spring 71 yields and a relative rocking movement takes place between the bell crank and the lever 68 which imparts a forward thrust to the plunger. The lever 68 extends rearwardly from the bell-crank arms 62 and 64 and is pivotally mounted for heightwise swinging movement about a horizontal pin 74 secured in the bracket 32. The downward thrust of the spring 71 is exerted against a plunger 77 (see also Fig. 13) having a broad flat base which engages a flat surface 81 on the plate 24 to hold the plate yieldingly in a desired angular position about the pin 69. The spaced arms of the lever 68 extend between the spaced plates of the bracket 32. Formed upon the upper end portions of the plates comprising the bracket 32 are arcuate finished bearing surfaces 75 for guiding and laterally supporting the lever 68.

Pivotally depending from a pin 76 secured to the arms of the lever 68 are a pair of spaced parallel links 78. The lower ends of the links 78 are pivotally connected by pins 79 to the forward ends of a pair of spaced parallel links 80, the rear ends of which are pivotally mounted upon a pin 82 secured in the bracket 32. Secured to the links 78, and occupying the space between said links sufficiently below the lever 68 for clearance, is a block 84 on the rear surface of which are formed ratchet teeth 86. Pivotally connected by a pin 88 to a fitting 89 on the upper end of a treadle rod 90 is a ratchet bar 92 in the form of a bell crank having a short forwardly extending arm and a long upwardly extending arm. The forward end of the forwardly extending arm carries the pin 88 while the junction of the two arms is pivotally connected by a pin 94 to the forward ends of a pair of spaced parallel links 96, the rear ends of the links 96 being pivotally mounted for heightwise swinging movement upon the pin 82. The long upwardly extending arm of the ratchet bar 92 has formed on it ratchet teeth 98 which cooperate with the teeth 86 to draw the lever 68 downwardly but which slide freely over the ratchet teeth 86 upon opposite relative movement between the ratchet bar 92 and the block 84. A pin 100 secured in the lever 68 serves to limit the movement of the ratchet bar 92 away from the block 84.

The lower end of the treadle rod 90 is pivotally connected to a treadle 102 which is fulcrumed upon a pin 104 secured in the lower portion of the frame 28. A tension spring 106 holds the treadle up to a stop position adjustably determined by a screw 108 threaded through the treadle and bearing against an abutment surface 110 formed in an opening in the front wall of the frame 28.

A tension spring 112 is secured at one end to a pin 114 carried by the lever 68 and at its opposite end to a pin 116 (Fig. 2) carried by the links 96. The distance between the pin 114 and the pin 74 is considerably less than the distance between the pin 116 and the pin 82, and the spring 112 has a greater tendency to draw the link 96 upwardly than to draw the lever 68 downwardly. The relative approach between the link 96 and the lever 68 resulting from the tension of the spring 112 is limited by a pair of spaced parallel links 118 pivotally mounted at their lower forward ends upon the pin 94 and having longitudinal slots 120 (Fig. 1) formed in their upper rearward ends. Slidably engaging the slots 120 is a pin 122 carried by the lever 68.

Pivotally mounted upon the pin 82 for heightwise swinging movement and extending forwardly and downwardly therefrom is a pair of spaced parallel links 124. The forward ends of the links 124 are pivotally connected by pins 125 to the lower ends of a pair of spaced parallel plates which together comprise a cam 126. Formed in the parallel plates of the cam 126 are a pair of parallel curved cam slots 128 which are engaged by rolls 130 (Fig. 5) mounted on the respective pins 79. The cam slots 128 are closed at their upper and lower ends. Bridging the upper ends of the parallel plates which comprise the cam 126 and extending forwardly therefrom is the tool 26. The work-engaging portion of the tool 26 is concave to bear against the end of a platform of a shoe. A tension spring 132 (Fig. 1) secured at its upper end to a pin 134 carried by the link 124 and anchored at its lower end to the frame 28 normally holds the link 124 down in a stop position determined by the engagement of the lower end of the cam 126 with a plate 136 on the shelf 30 surrounding the opening through which the treadle rod 90 passes.

The above-described machine is used to turn the platform cover first at one end of a shoe and then at the other end. The intermediate portion of the cover, if it has not already turned of its own accord, may then easily be turned by hand. The mounting of either end portion upon the appropriate turning tool can be performed most conveniently when the tool is in its out-of-the-way position; thus, when using the heel turning tool 22 the slide 52 should be at the left-hand limit of its range of movement, and when using the toe turning tool 20 the slide should be at the right-hand limit of its range of movement. After the shoe has been mounted on either tool the slide is shifted to bring that tool into operating position. While no difficulty will be experienced in mounting the toe portion of the shoe upon the toe turning tool 20, a certain amount of manipulation is required to mount the heel portion of the shoe on the heel turning tool 22. A simple way of doing this by a combination of translatory and rotary movements is shown in Figs. 7 to 10 inclusive. Referring to Figs. 7 and 8, the operator, standing in front of the machine, holds the shoe sidewise, toe end to the left and heel end to the right, with the bottom of the shoe away from him; and, holding the shoe in this position, he moves it forwardly to engage the rearwardly extending loop of the U-shaped portion 46 of the heel turning tool between the cover C and the upper U of the shoe. All of the shoe except a portion of the cover C is above the U-shaped member 46 during this operation. The operator then swings the toe end of the shoe toward him while at the same time rotating the shoe about its longitudinal axis from a sidewise to an inverted position. The shoe is thus moved from the positions shown in Figs. 7 and 8 through the position shown in Fig. 9 to the positions shown in Figs. 10 and 11.

The turning of the platform cover is most conveniently accomplished while the shoe is on its last. The turning tool, when the shoe is mounted on it, occupies a position between the platform cover and the last. When, as shown herein, the shoes have open backs, the turning tool for the heel end will be in direct contact with the last. In operations upon the toe ends of shoes, or upon the heel ends of shoes having closed backs, the upper of the shoe will be interposed between the turning tool and the last. In all cases, however, of shoes mounted upon lasts, the turning tool, whether in contact with the last or with the upper, will be between the platform cover and the last. In the case of shoes not mounted upon lasts, it is sufficient to say that the tool engages within the platform cover.

The operation of the machine will now be described. One end of the shoe S is mounted upon the proper U-shaped turning tool; for example, the heel end is mounted as just described upon the tool 22. The shoe will then occupy the position shown in Figs. 1, 10 and 11. The U-shaped portion 46 of the turning tool closely hugs the upper of the shoe and is between the upper and the cover C. The operator then shifts the slide 52 to the right and depresses the treadle 102, causing the ratchet bar 92 to rock in a counterclockwise direction from the position shown in Fig. 1 to the position shown in Figs. 2 and 3. When the ratchet bar 92 is thus brought up against the block 84 and can rotate no further, continued depression of the treadle operating through the lower end of the ratchet bar will draw the links 96 downwardly. As the links 96 descend, the links 118 will descend also, while the spring 112 will draw down the lever 68 as far as permitted by the inner end of the slot 120. Because the distance from the pin 94 to the pin 82 along the link 96 is much greater than the distance between the pin 122 and the pin 74 on the lever 68, the lever 68 will travel downwardly at a faster rate than the link 96. During this downward movement of the lever 68 the relative movement between the ratchet teeth on the bars 78 and 92 will be in such a direction that the ratchet teeth 86 on the bar 78 will slide over the ratchet teeth 98 on the bar 92. As soon as the plunger 24 engages the bottom of the shoe S, the spring 71 (Fig. 1) will yield to permit the plunger 24 to swing about the pin 60 until it bears flat against the bottom of the shoe. Furthermore, the resistance which the shoe affords to further downward movement of the plunger 24 will tend to swing the bell crank comprising the arms 62 and 64 in a clockwise direction about the pin 66 as far as permitted by the slot 72. The plunger 24 is thus moved forwardly relatively to the turning tool 22 and in the course of such movement it tends to move the shoe forwardly with it. Another effect of the resistance of the shoe to further downward movement of the plunger 24 is to overcome the influence of the spring 112, which is relatively weak because of the shortness of the moment arm of the spring about the pin 74. Although the spring 112 is now no longer able to cause rapid descent of the lever 68, the lever cannot remain stationary because the ratchet teeth 98 will engage the ratchet teeth 86 and draw the lever 68 down slowly under the direct pull of the treadle 102. The plunger 24 thus descends rapidly until it engages the shoe bottom, and then, no matter how high or how low the shoe bottom may be by reason of its thickness, the plunger 24 at once begins its slow operative stroke. As the plunger 24 descends it will push the heel end of the shoe downward inside the U-shaped portion 46 of the heel turning tool while the cover C will be obliged to turn right side out over the U-shaped portion 46.

Figure 1:
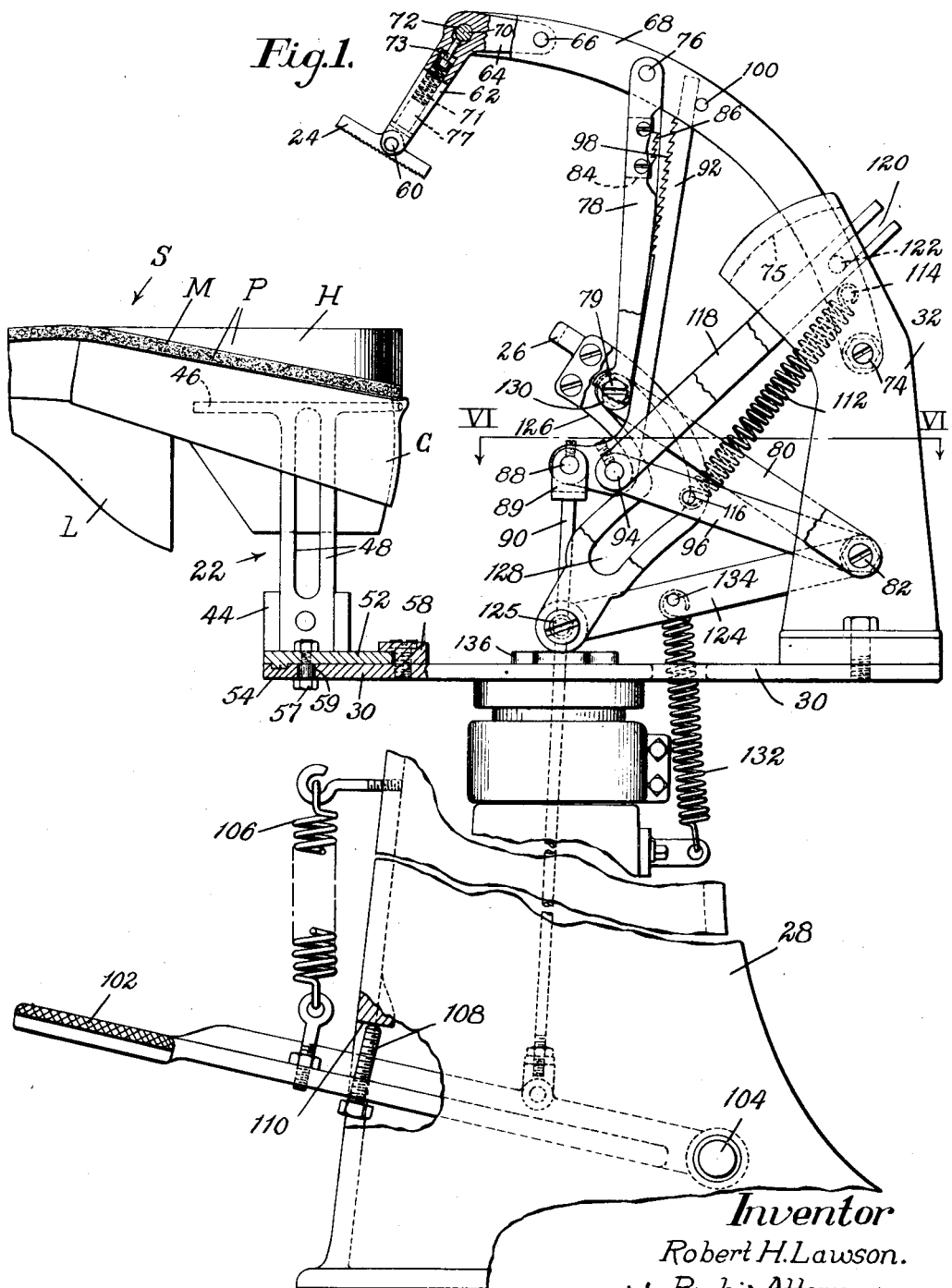
Fig. 1 is a side elevation of an illustrative machine embodying the invention, with portions of the frame of the machine broken away.

Referring to Fig. 1, it will be observed that in the position occupied by the shoe after the heel end of the shoe has been mounted upon the turning tool the marginal portion of the midsole M at the heel end of the shoe will lie over the rear portion of the loop of the U-shaped turning tool. In order to enable the shoe to descend inside the U-shaped turning tool, it is necessary to move the shoe forwardly from its original position. The plunger 24, as has already been pointed out, exerts a forward thrust upon the shoe which tends to move the shoe forwardly. However, because of the tightness of the cover at the heel end of the shoe, a more positive device in the form of the tool 26 is provided for accomplishing this purpose. The shape of the upper portion of the cam slot 128 is such as to cause the tool 26 to advance far enough not only to engage the rear surface of the heel portion H of the platform P but also to push the heel portion H forwardly during the first portion of the descent of the rolls 130. The lower portion of the cam slot 128 is arcuate on the radius of the links 80 and, when the cam 126 has swung about the pins 125 into its forward position, is concentric with the pin 82 to enable the rolls 130 to descend further without affecting the position forwardly or rearwardly of the tool 26.

Another function of the tool 26 is to tension the cover C by pressing or snubbing the cover against the U-shaped portion 46 of the turning tool as the cover is drawn over it. In addition to the forward swinging movement of the tool 26 about the pins 125 there will also be a downward component. This downward component will be greatest at the most forward position of the tool 26, and it will be enough, as the tool 26 advances beyond the U-shaped portion 46, to cause the tool to bear down upon the cover C and press the cover against the U-shaped portion 46. The spring 132 will yield slightly to permit further swinging movement of the cam 126, and the bottom of the cam will rise slightly from the plate 136, while the cover C will be pressed against the U-shaped portion 46 with a force exerted by the spring 132. Thus, as the cover is being turned it is also tensioned to pull it taut and to remove wrinkles.

Upon release of the treadle 102 the spring 106 will raise the treadle until the stop screw 108 engages the abutment surface 110. While the treadle is rising, the upward thrust of the rod 90 will raise the pin 88 and the tension of the spring 112 will raise the pin 94. As soon as the upward movement of the links 118 has brought the closed inner ends of the slots 120 into engagement with the pin 122, the upward movement of the pin 94 is momentarily retarded and the arm 92 is thereby caused to swing in a clockwise direction until it strikes the stop pin 100. The ratchet teeth 98 are thus swung out of the way of the ratchet teeth 86, and the upward movement of the treadle, acting through the lower end of the arm 92 and through the links 118 against the pin 122, raises the arm 68 to its initial position. It will be observed that in the initial position of the machine, as shown in Fig. 1, the arm 92 is against the stop 100 rather than against the block 84. The reason for this is that whatever tendency the spring 112 might have to contract further (after the end of the slot 120 has engaged the pin 122) and thereby to swing the arm 92 counter-clockwise about the pin 88 is overcome by the weight and leverage of the arm 68 and its associated parts after the treadle has reached its upper stop position.

It will also be observed that in the initial position of the machine as shown in Fig. 1 the cam rolls 130 are below the tops of the cam slots 128. When a high adjustment of the plunger 24 is desired (for operation upon platforms having thick midsoles and high heels), the stop screw 108 may be loosened until the cam rolls 130 engage the upper ends of the slots 128. When the screw 108 is backed away from the abutment 110, the upper ends of the slots 128 function as a treadle stop, and the full swing of the treadle is available.

After the heel end of the cover has thus been turned, the operator mounts the toe portion of the shoe upon the tool 20, shifts the slide 52 to the left to position the tool 20 under the plunger 24, and depresses the treadle 102, causing the toe end of the cover to be turned in the same way that the heel end was turned, as illustrated in Figs. 15 and 16, which show respectively the initial and final stages of the operation.

Often the portions of the cover at the shank of the shoe will turn naturally when the ends are turned. If not, the shank portions of the cover may be turned easily by hand. The completely turned cover will then appear as shown in Fig. 17.

The snubbing effect of the tool 26, as has already been mentioned, serves to tension the cover and smooth out any wrinkles that may be present while the cover is being turned. However, in some cases a strong snubbing action is not desirable. For example, many covers composed of leather offer so much resistance to being turned that they develop a sufficient tension without need of snubbing. The additional resistance occasioned by the snubbing tool would not only increase the difficulty of turning these covers but might also damage the covers by causing them to tear. While the snubbing action of the tool 26 in the machine above described could be lessened by substituting a weaker spring for the spring 132, or could be eliminated by removing the spring 132, such an arrangement would not provide a sufficient hold-down for the cam 126.

To adapt the machine for operations requiring little or no snubbing action, the modification shown in Figs. 18 and 19 may be employed. It may be noted here that such parts of the modified machine as are identical with parts of the machine already described will be identified by the same reference numerals. The cam in the modified machine, because it differs somewhat in design from that in the original machine, will be identified by the reference numeral 126', and the cam slot will be identified by the reference numeral 128'. The cam 126', like the cam 126, is held down by the spring 132. The most important difference presented in the modified machine is that the tool 26, instead of being secured directly to the cam 126', is secured upon the end of a substantially horizontal pair of parallel bars 150 which are pivotally connected by a pin 152 to a lug 154 extending upwardly from the upper portion of the cam 126'. Formed in the opposite end portions of the bars 150 are longitudinal slots 156 which are closed at both ends and which slidably engage the ends of the pin 74. It is evident that in the construction above described the descent of the cam rolls will swing the cam 126' in a counterclockwise direction from the position shown in Fig. 18 to that shown in Fig. 19, causing the bars 150 to advance toward the heel end of the shoe. Inasmuch as the pivot pin 152 during the course of this movement passes over the fulcrum pin 125 of the cam with a swinging movement of relatively slight amplitude, the vertical displacement of the tool 26 will be relatively slight. The tool 26 is secured to the bars 150 by a pair of clamping screws 158 which pass through enlarged holes in a lug formed on the tool and embraced by the end portions of the bars. The screws 158 may be loosened and the tool 26 moved to its desired position, whereupon the screws 158, when tightened, will clamp the end portions of the bars firmly against the sides of the lug on the tool 26 and hold the tool rigidly in its adjusted position. The tool 26 may thus be adjusted high enough to exert no snubbing action whatever upon the cover, or, if desired, it may be adjusted low enough to utilize the slight downward displacement of the tool 26 as the tool completes its advancing movement to exert some snubbing action upon the cover. Only a slight heightwise adjustment of the tool 26 is required to obtain the desired effect. The tool 26 may also be adjusted forwardly or rearwardly to vary the extent of its forwardly thrusting action upon the heel H.

Having described my invention, what I claim as new and desire to secure by Letters Patent of the United States is:

1. The method of turning the platform covers of platform shoes on their lasts which consists in manipulating a shoe by a combination of translatory and rotary movements to effect the engagement, between the platform cover and the last at the heel end of the shoe with the shoe in inverted position, of a stationary blunt-edged tool which is U-shaped to conform approximately to the outline of that end of the shoe, and exerting a downward thrust against the shoe bottom to move the shoe downwardly to effect the turning of the cover over said tool.

2. The method of turning the platform covers of platform shoes on their lasts which consists in manipulating a shoe by a combination of translatory and rotary movements to effect the engagement, between the platform cover and the last at the heel end of the shoe with the shoe in inverted position, of a stationary blunt-edged tool having slight extent height-wise of the shoe and U-shaped to conform approximately to the outline of that end of the shoe, exerting a downward thrust against the shoe bottom to move the shoe downwardly to effect the turning of the cover over said tool, and performing a turning operation at the toe end of the shoe with a tool shaped to conform approximately to said toe end.

3. The method of turning the platform covers of platform shoes which consists in causing relative movement between a shoe and a tool to effect the engagement of the tool within the platform cover at one end of the shoe, causing a relative heightwise movement between the shoe and said tool to effect the turning of the cover over the tool at that end of the shoe, and during said heightwise movement to effect a relative lengthwise movement between the shoe and the tool to cause the tool to clear the extension of the platform.

4. The method of turning the platform covers of platform shoes on their lasts which consists in causing relative movement between a shoe and a tool to effect the engagement of the tool between the platform cover and the last, causing a relative heightwise movement between the shoe and said tool to effect the turning of the cover over the tool, and frictionally retarding the cover while it is being turned to stretch the cover tight and smooth.

5. The method of turning the platform covers of platform shoes on their lasts which consists in engaging a U-shaped turning tool between the platform cover and the last at one end of the shoe, effecting relative heightwise movement between the shoe and the tool to turn the cover, and snubbing the cover against the tool while the cover is being turned to tension the cover and smooth out wrinkles.

6. The method of positioning upon a U-shaped turning tool a shoe having an unturned platform cover which consists in moving the shoe while holding it in a sidewise position in such a direction as to engage the loop of the tool between a last on which the shoe is mounted and the platform cover near the heel end of the shoe, and then simultaneously swinging the shoe through a horizontal angle of ninety degrees while turning the shoe from a sidewise to an inverted position to bring the platform cover over the tool and to cause the tool to engage the last around the heel end of the last.

7. A tool for use in the turning of the platform covers of platform shoes comprising a blunt-edged generally U-shaped member of small extent heightwise of the shoe and curved to conform approximately to the outline of an end of a shoe and adapted for engagement within the platform cover at that end of the shoe, said member being laterally resilient to enable it to yield to fit shoes of different sizes or shapes.

8. A tool for use in the turning of the platform covers of platform shoes comprising a narrow blunt-edged generally U-shaped member curved to conform approximately to the outline of an end of a shoe and adapted for engagement between the platform cover and the body of the shoe at that end of the shoe, said member being resilient to enable it to yield to fit shoes of different sizes or shapes, and a support for said member connected thereto at a locality remote from the two ends of said member to leave the end portions free to yield.

9. A machine for turning the platform covers of platform shoes comprising a U-shaped tool of small extent heightwise of the shoe and having a continuous edge, said tool being curved to conform approximately to the outline of an end of a shoe and adapted to be engaged within the platform cover of the shoe, an abutment engageable with the bottom of the shoe, and means for effecting relative movement between said tool and said abutment to cause the cover to be turned.

10. A machine for turning the platform covers of platform shoes comprising a continuous U-shaped tool of small extent heightwise of the shoe adapted to be engaged within the platform cover of an inverted shoe, resilient stationary supports for the sides only of said tool, a plunger engageable with the bottom of the shoe, and means for moving the plunger to push the shoe to cause the cover to be turned by the tool.

11. A machine for turning the platform covers of platform shoes comprising a tool adapted to be engaged between the platform cover and the body portion of a shoe at one end of the shoe, an abutment engageable with the bottom of the shoe at that end of the shoe, means for effecting relative heightwise movement between said tool and said abutment to cause the cover to be turned over the tool, and means for imparting to said heightwise movement a lengthwise component to cause the extension of the platform beyond the body portion of the shoe to clear the tool.

12. A machine for turning the platform covers of platform shoes comprising a tool adapted to be engaged between the platform cover and the body portion of an inverted shoe at one end of the shoe, a plunger engageable with the bottom of the shoe at that end of the shoe, means for depressing said plunger to urge the shoe downwardly to cause the cover to be turned over said tool, and a connection between said tool and said depressing means constructed and arranged to cause the downward thrust of the depressing means to exert on the plunger a component which is lengthwise with respect to the shoe to enable the extension of the platform beyond the body portion of the shoe to clear the tool.

13. A machine for turning the platform covers of platform shoes comprising a tool adapted to be engaged between the platform cover and the body portion of an inverted shoe at one end of the shoe, a plunger engageable with the bottom of the shoe at that end of the shoe, a movable abutment engageable with the edge surface of the platform at that end of the shoe, and operating means organized to depress the plunger to urge the shoe downwardly to cause the cover to be turned over said tool and at the same time to move said abutment lengthwise of the shoe to push the shoe far enough to enable the extension of the platform of the shoe to clear the tool.

14. A machine for turning the platform covers of platform shoes comprising a pair of cover-turning tools adapted to operate at the toe and the heel ends respectively of a shoe, a tool movable in a predetermined path for cooperating with said cover-turning tools to turn the cover at the toe and the heel ends of the shoe, and a carrier for said pair of cover-turning tools mounted for movement to enable the tools of said pair to be brought alternatively into operative position relatively to the tool which is movable in a predetermined path.

15. A machine for turning the platform covers of platform shoes comprising a tool adapted to be engaged between the platform cover and the body portion of an inverted shoe at one end of the shoe, said tool being of suitable size and shape to fit approximately around that end of the shoe, a second tool adapted to be inserted between the platform cover and the body portion of the shoe at the other end of the shoe, the second-mentioned tool being of suitable size and shape to fit approximately around said other end of the shoe, a plunger engageable with the bottom of a shoe at one end of the shoe when one of said tools is inserted between the platform cover and the body portion of the shoe at that end of the shoe, means for moving the plunger to push the shoe to cause the cover to be turned by the tool, a carrier upon which both of said tools are mounted, and a support for said carrier constructed and arranged to enable the support to be moved to bring either tool into operating position relatively to said plunger.

16. A machine for turning the platform covers of platform shoes comprising a U-shaped tool adapted to be engaged between the platform cover and the body portion of a shoe at an end of the shoe, means for effecting relative movement heightwise of the shoe between the shoe and said tool to turn the cover, a tool having a concave surface for engaging the end of the shoe, and means for causing the second-mentioned tool to press the cover against the U-shaped turning tool to frictionally retard and thereby tension the cover as the cover is being turned.

17. A machine for turning the platform covers of platform shoes comprising a U-shaped tool adapted to be engaged between the platform cover and the body portion of a shoe at an end of the shoe, means for effecting relative movement heightwise of the shoe between the shoe and said tool to turn the cover, a tool engageable with the end of the shoe, means for pushing the second-mentioned tool lengthwise of the shoe to move the shoe lengthwise relatively to the U-shaped tool far enough to enable the extension of the platform of the shoe to clear the U-shaped tool, and resilient means acting upon the second-mentioned tool to cause the second-mentioned tool to snub the cover against the U-shaped tool as the cover is being turned to tension the cover and smooth out wrinkles.

18. A machine for turning the platform covers of platform shoes comprising a tool adapted to be engaged between the platform cover and the body portion of a shoe, an abutment engageable with the bottom of the shoe, and means for moving said abutment rapidly with relatively little mechanical advantage into engagement with the shoe bottom and for thereafter continuing the movement of the abutment against the shoe bottom with greater mechanical advantage to move the shoe heightwise and thereby cause the cover to be turned over said tool.

19. A machine for turning the platform covers of platform shoes comprising a tool adapted to be engaged between the platform cover and the body portion of a shoe, an abutment engageable with the bottom of the shoe, a treadle, yieldable connections between said treadle and said abutment for moving the abument rapidly but with little mechanical advantage into engagement with the shoe bottom, and means operated by the abutment upon encountering the resistance of the shoe for connecting the abutment positively to the treadle to enable the operator to continue the movement of the abutment with greater mechanical advantage to move the shoe heightwise and thereby cause the cover to be turned over said tool.

ROBERT H. LAWSON.

REFERENCES CITED

The following references are of record in the file of this patent:

UNITED STATES PATENTS

| Number | Name | Date |
|---|---|---|
| 594,810 | Ryan | Nov. 30, 1897 |
| 1,733,264 | Horne | Oct. 29, 1929 |
| 2,081,228 | Engel | May 25, 1937 |

FOREIGN PATENTS

| Number | Country | Date |
|---|---|---|
| 169,709 | Germany | Apr. 6, 1906 |